United States Patent
Cheung

(10) Patent No.: US 8,386,846 B2
(45) Date of Patent: Feb. 26, 2013

(54) NETWORK SWITCH WITH BACKUP POWER SUPPLY

(75) Inventor: Thomas Kwok Yin Cheung, Fremont, CA (US)

(73) Assignee: Gigamon LLC, Milpitas, CA (US)

( * ) Notice: Subject to any disclaimer, the term of this patent is extended or adjusted under 35 U.S.C. 154(b) by 46 days.

(21) Appl. No.: 12/775,326

(22) Filed: May 6, 2010

(65) Prior Publication Data

US 2011/0276824 A1   Nov. 10, 2011

(51) Int. Cl.
   *G06F 11/00* (2006.01)
(52) U.S. Cl. .................. 714/14; 307/112; 455/67.11
(58) Field of Classification Search .............. 714/14; 307/112; 455/67.11
   See application file for complete search history.

(56) References Cited

U.S. PATENT DOCUMENTS

| | | | | |
|---|---|---|---|---|
| 5,317,198 | A * | 5/1994 | Husbands | 307/116 |
| 5,920,607 | A * | 7/1999 | Berg | 379/1.01 |
| 6,151,483 | A * | 11/2000 | Nguyen | 455/67.11 |
| 6,507,172 | B2 | 1/2003 | Sherman | |
| 6,859,668 | B1 * | 2/2005 | Ginzburg et al. | 700/19 |
| 6,901,605 | B1 * | 5/2005 | Sugiura et al. | 725/118 |
| 7,109,424 | B2 * | 9/2006 | Nordin et al. | 174/113 R |
| 7,236,779 | B2 * | 6/2007 | Lahav et al. | 455/423 |
| 7,371,014 | B2 * | 5/2008 | Willis et al. | 385/89 |
| 7,818,591 | B2 * | 10/2010 | Schindler | 713/300 |
| 7,873,057 | B2 * | 1/2011 | Robitaille et al. | 370/401 |
| 7,904,115 | B2 * | 3/2011 | Hageman et al. | 455/561 |
| 2002/0105344 | A1 * | 8/2002 | Bohley | 324/662 |
| 2004/0260812 | A1 * | 12/2004 | Rhodes et al. | 709/225 |
| 2005/0254490 | A1 * | 11/2005 | Gallatin et al. | 370/389 |
| 2005/0265248 | A1 | 12/2005 | Gallatin | |
| 2005/0265364 | A1 | 12/2005 | Gallatin | |
| 2005/0271065 | A1 | 12/2005 | Gallatin | |
| 2005/0273281 | A1 * | 12/2005 | Wall et al. | 702/60 |
| 2006/0117089 | A1 * | 6/2006 | Karam | 709/208 |
| 2006/0143583 | A1 * | 6/2006 | Diab et al. | 716/4 |
| 2007/0254609 | A1 * | 11/2007 | Rosenthal et al. | 455/127.1 |
| 2008/0107016 | A1 * | 5/2008 | Tang | 370/217 |
| 2008/0111423 | A1 * | 5/2008 | Baker et al. | 307/64 |
| 2008/0256372 | A1 * | 10/2008 | Schindler | 713/300 |
| 2008/0311877 | A1 * | 12/2008 | Darshan | 455/402 |
| 2009/0105848 | A1 * | 4/2009 | El-Sayed | 700/21 |
| 2009/0135835 | A1 | 5/2009 | Gallatin | |
| 2009/0245128 | A1 * | 10/2009 | Matityahu et al. | 370/252 |
| 2009/0262745 | A1 | 10/2009 | Leong | |
| 2010/0062734 | A1 * | 3/2010 | Chan | 455/127.2 |
| 2010/0150564 | A1 * | 6/2010 | Faulkner | 398/115 |
| 2010/0156191 | A1 * | 6/2010 | Dozier et al. | 307/81 |
| 2010/0241806 | A1 * | 9/2010 | Kawano et al. | 711/118 |
| 2011/0206055 | A1 * | 8/2011 | Leong | 370/401 |
| 2011/0211443 | A1 * | 9/2011 | Leong et al. | 370/218 |

* cited by examiner

*Primary Examiner* — Loan L. T. Truong
(74) *Attorney, Agent, or Firm* — Vista IP Law Group, LLP

(57) ABSTRACT

A network switch apparatus includes a housing, a first network port, a second network port, a first instrument port, an active component inside the housing, wherein the active component is configured to receive packets from the first network port, and pass at least some of the packets from the first network port to the first instrument port, a connector for supplying power from a power supply to the active component, and a backup power supply for supplying power to the active component when the active component does not receive power from the power supply.

30 Claims, 8 Drawing Sheets

Requirement: d1 + d2 ≤ d max

Requirement: d1 ⩽ d max
d2 ⩽ d max

Requirement: d1 + d2 ⩽ d max

NETWORK SWITCH WITH BACKUP POWER SUPPLY

FIELD

This application relates generally to network switch devices.

BACKGROUND

Network switches have been used to forward packets from one node to another node. Such network switch devices include a first network port for receiving packets from a first node, and a second network port for passing the packets to a second node.

Some existing network switch devices include an active component, such as a processor or a switch module, configured to pass packets from a network port to an instrument port in accordance with a design scheme. The instrument port allows the packets to be transmitted to an instrument, such as an intrusion prevention system (IPS), sniffer, network monitoring system, application monitoring system, intrusion detection system, forensic storage system, and application security system, etc., so that the packets being transmitted from one node to another node may be analyzed and examined. The active components in such network switch devices require power to operate.

Some existing network switch devices also include a relay (FIG. 1). In the event of a power failure, the switch module cannot be operated, and the relay is configured to bypass the switch module, and physically connect two network ports, so that packets from one network port may be directly passed onto the other network port without being transmitted to the instrument port for processing by the monitor tool (FIG. 2).

Applicants of the subject application determine that use of relays in network switches as the immediate or only solution for addressing power failure may not be desirable. This is because relays may not be reliable. Also, existing relays may not support high speed signal, such as 250 Mhz or higher. In addition, when relays are used, the nodes that are communicating through the network switch device may see a link down for a very short duration (e.g., range of msec). The problem of having the communicating nodes see a link down event is that, if either or both of the nodes participate in the Spanning Tree Protocol (or the Rapid Spanning Tree Protocol), then the link down event may trigger a Spanning Tree Protocol re-configuration, which is not desirable. The link down will in turn cause causes data/packet loss.

Furthermore, when relays are used, the network switch device may fail the cable length distance requirement. The cable length distance is the maximum allowable or preferred distance $d_{max}$ that is between two active components (e.g., components that require power to run). For example, the distance between a transmitting node (which may be an example of an active component) and the network switch device's switch module (which may be another example of an active component) may be d1, and the distance between a receiving node and the network switch device's switch module may be d2. In such cases, as long as the switch module in the network switch device is working, d1 may be as long as $d_{max}$, and d2 may be as long as $d_{max}$ (e.g., d1 may equal to $d_{max}$, and d2 may equal to $d_{max}$) (FIG. 1). However, when the network switch device's active component is not operating (e.g., due to power failure to the active component), and when relays are used to directly couple the two communicating nodes, then the requirement becomes that $d1+d2 \leq d_{max}$ (FIG. 2). In the above example, if d1 already has a length that is $d_{max}$ (d1=$d_{max}$) and d2 already has a length that is $d_{max}$ (d2=$d_{max}$), then $d1+d2=2d_{max}$, which would exceed the cable length distance requirement of $d1+d2 \leq d_{max}$.

For the foregoing reasons, applicants of the subject application determine that it would be desirable to provide improved network switch devices that do not use relay as the immediate or only solution for addressing power failure.

SUMMARY

In accordance with some embodiments, a network switch apparatus includes a housing, a first network port, a second network port, a first instrument port, an active component inside the housing, wherein the active component is configured to receive packets from the first network port, and pass at least some of the packets from the first network port to the first instrument port, a connector for supplying power from a power supply to the active component, and a backup power supply for supplying power to the active component when the active component does not receive power from the power supply.

In accordance with other embodiments, a network switch apparatus includes a housing, a first network port, a second network port, an inline port for communication with a pass-through device, an active component inside the housing, wherein the active component is configured to receive packets from the first network port, pass the packets from the first network port to the inline port for processing by the pass-through device, receive the packets from the pass-through device through the inline port after the packets have been processed by the pass-through device, and pass the packets from the inline port to the second network port, a connector for supplying power from a power supply to the active component, and a backup power supply for supplying power to the active component when the active component does not receive power from the power supply.

Other and further aspects and features will be evident from reading the following detailed description of the embodiments, which are intended to illustrate, not limit, the invention.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

DESCRIPTION OF THE EMBODIMENTS

Figure 1:
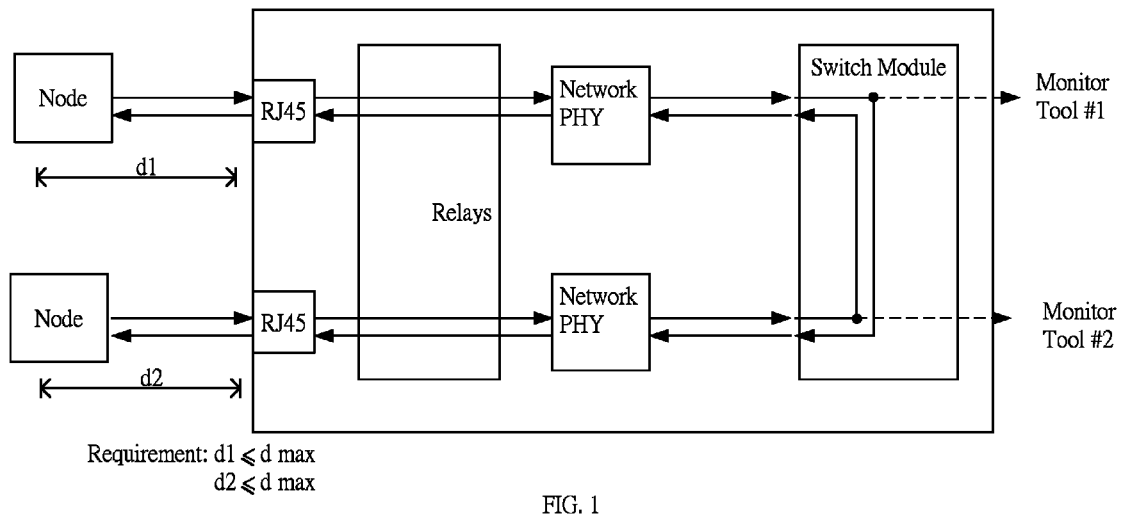
FIG. 1 illustrates a network switch device with relays, particularly showing the network switch device being operated in a normal condition.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated.

Figure 3:
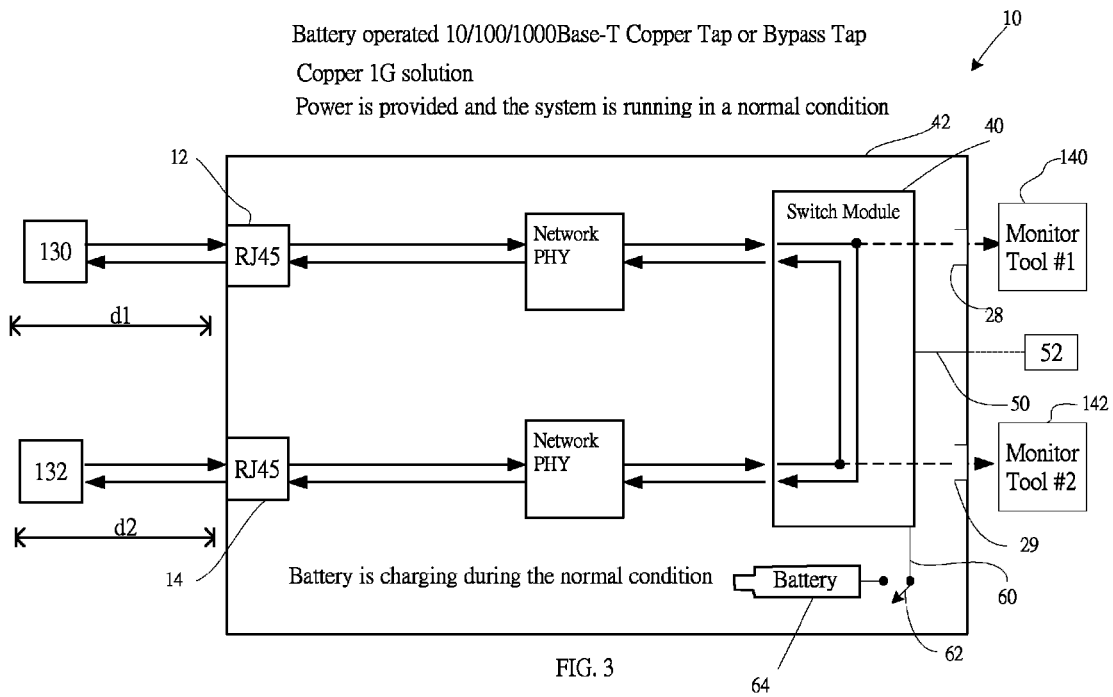
FIG. 3 illustrates a network switch device in accordance with some embodiments, particular showing the network switch device being operated in a normal condition.

FIG. 3 illustrates a network switch device 10 in accordance with some embodiments. The device 10 includes a first network port 12, a second network port 14, and a first instrument port 28, and a second instrument port 29. The device 10 also includes an active component 40, and a housing 42 for containing the component 40. In the illustrated embodiments, the device 10 also includes a Network PHY coupled to each of the respective ports 12, 14, wherein the Network PHYs may be considered to be parts of the active component 40. Alternatively, the Network PHYs may be considered to be components that are separate from the active component 40. The PHY is configured to connect a link layer device to a physical medium such as an optical fiber or copper cable. The housing 42 allows the device 10 to be carried, transported, sold, and/or operated as a single unit. The ports 12, 14, 28, 29 are located at a periphery of the housing 42. In other embodiments, the ports 12, 14, 28, 29 may be located at other locations relative to the housing 42. In the illustrated embodiments, the device 10 also includes a connector 50 for transmitting power from a power source 52 to the active component 40. The connector 50 may be an electrical conductor, or a circuit, that is capable of transmitting power from the power source 52.

The device 10 further includes a monitoring device 60, a switch 62, and a backup power source 64. The power source 64 may be a rechargeable battery. For example, the connector 50 may be directly or indirectly coupled to the backup power source 64 for charging the backup power source 64. Alternatively, the power source 64 may be any device that is capable of providing power, such as a capacitor (e.g., a supercapacitor). The monitoring device 60 is configured to monitor a parameter, or lack thereof, that is associated with a power being delivered to the active component 40. By means of non-limiting examples, the parameter may be a voltage, a current, or a magnitude of the power from the power supply 52. When the monitored parameter indicates that the power source 52 is not providing power, the switch 62 then causes power from the backup power supply 64 to be delivered to the active component 40 for providing backup power to the active component 40. The switch 62 may be implemented using hardware, software, or combination thereof. Thus, as used in this specification, the term "switch" should not be limited to any mechanical component, and may refer to circuitry having a hardware component and/or a software component.

Figure 4:
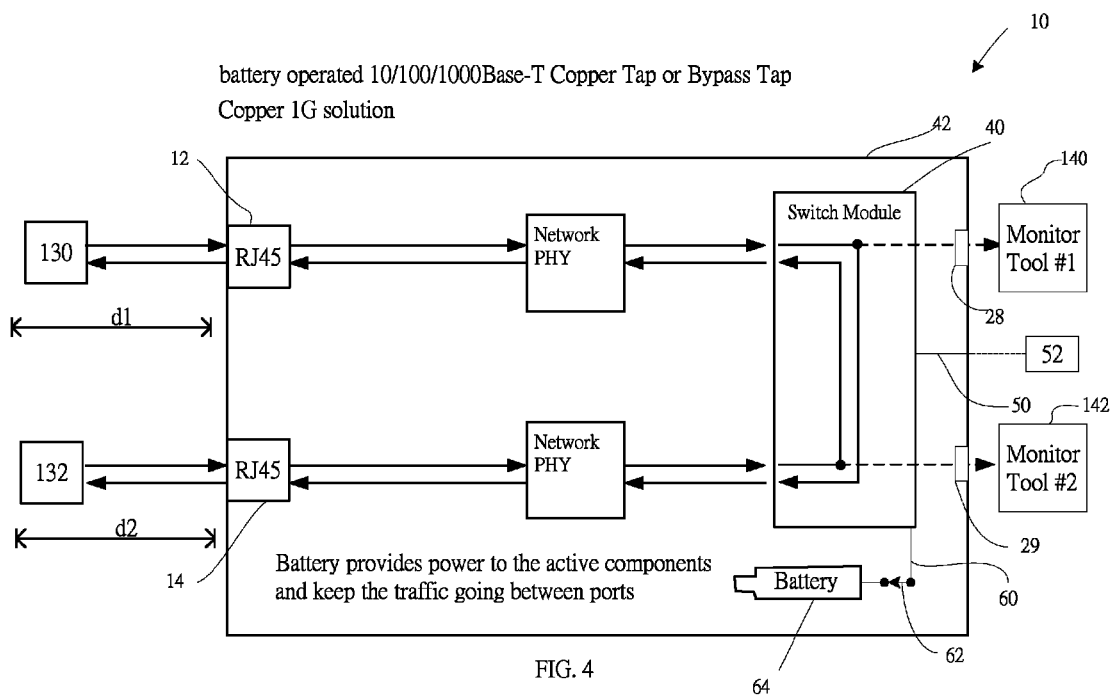
FIG. 4 illustrates the network switch device of FIG. 3, particular showing the network switch device being operated by a backup power source.

In one implementation, the monitoring device 60 and the switch 62 may be implemented using a power switch. The power switch together with the backup power supply 64 form an uninterrupted power supply (UPS). The power switch is configured to allow power to be delivered from the power supply 52 to the active component 40 as long as it senses a current, voltage, or a power that is resulted from the power supply 52. For example, the power switch may receive the signal either directly from the power supply 52, or indirectly from the power supply 52 via the active component 40, or via another component that receives power from the power supply 52. When the power supply 52 fails, the power switch does not sense any current, voltage, or power that is resulted from the power supply 52. The power switch then directs power from the backup power supply 64 to the active component 40 (FIG. 4). The power switch may be implemented using diode, hardware, software, or combination thereof. In some embodiments, the power switch may be implemented using circuitry such as those disclosed in U.S. Pat. No. 6,507,172, the entire disclosure of which is expressly incorporated by reference herein. As used in this specification, the term "power switch" may refer to any component as long as it can deliver power from a backup power supply to an active component in an uninterrupted manner in response to a failure of power delivery from a power supply to the active component.

Also, as used in this specification, the term "monitoring device" is not limited to any particular device that performs active or passive sensing, and may refer to any device that is capable of sensing a parameter (e.g., a current, a voltage, a power, etc.) or lack thereof. For example, the monitoring device 60 may be a wire for sensing a current, a voltage, a power, etc., or lack thereof. Also, in other embodiments, the switch 62 may be considered a part of the monitoring device 60, or vice versa.

In any of the embodiments, the packet switch 40 may be any network switching device (switch module) that provides packet transmission in accordance with a pre-determined transmission scheme. In some embodiments, the packet switch 40 may be user-configurable such that packets may be transmitted in a one-to-one configuration (i.e., from one network port to an instrument port). As used in this specification, the term "instrument port" refers to any port that is configured to transmit packets to an instrument, wherein the instrument may be a non-pass through device (i.e., it can only receive packets intended to be communicated between two nodes, and cannot transmit such packets downstream), such as a sniffer, a network monitoring system, an application monitoring system, an intrusion detection system, a forensic storage system, an application security system, etc., or the instrument may be a pass-through device (i.e., it can receive packets, and transmit the packets back to the device 10 after the packets have been processed), such as an intrusion prevention system. In other embodiments, the packet switch 40 may be configured such that the packets may be transmitted in a one-to-many configuration (i.e., from one network port to multiple instrument ports). In other embodiments, the packet switch 40 may be configured such that the packets may be transmitted in a many-to-many configuration (i.e., from multiple network ports to multiple instrument ports). In further embodiments, the packet switch 40 may be configured such that the packets may be transmitted in a many-to-one configuration (i.e., from multiple network ports to one instrument port). In some embodiments, the one-to-one, one-to-many, many-to-many, and many-to-one configurations are all available for allowing a user to selectively configure the device 10 so that the packets (or certain types of packets) are routed according to any one of these configurations. In some embodiments, the packet movement configuration is predetermined such that when the device 10 receives the packets, the device 10 will automatically forward the packets to the ports based on the predetermined packet movement configuration (e.g., one-to-one, one-to-many, many-to-many, and many-to-one) without the need to analyze the packets (e.g., without the need to examine the header, determine the type of packets, etc.).

Examples of packet switch 40 that may be used with the device 10 include any of the commercially available network switch devices, such as GigaVUE™, that is available at Gigamon LLC.

Other examples of packet switch 40 that may be used with the device 10 are described in U.S. patent application Ser. Nos. 12/148,481, 12/255,561, 11/123,273, 11/123,465, and 11/123,377, the entire disclosure of all of which is expressly incorporated by reference herein.

In accordance with some embodiments, the packet switch 40 may have the functionalities of a conventional packet switch except that it provides visibility into various parts of a network. Thus, embodiments of the packet switch 40 may operate like a conventional managed packet switch, but providing packet monitoring function. This is accomplished by configuring the packet switch to operate as a circuit switch under certain circumstances. In some embodiments, the configuring of the managed packet switch may be performed by utilizing a CPU interface of the switch to modify appropriate registers in the switch to allow for the desired operation.

It should be noted that the packet switch 40 that may be used with the device 10 is not limited to the examples described above, and that other packet switches 40 with different configurations may be used as well.

In some embodiments, the device 10 may include a CPU (not shown) configured to process information that may be used in the operation of the device 10. The CPU may be a part of the switch module 40.

Referring to FIG. 3, during use, the first network port 12 of the device 10 is communicatively coupled to a first node 130, and the second port 14 is communicatively coupled to a second node 132. The device is configured to communicate packets between the first and second nodes 130, 132 via the network ports 12, 14. Also, during use, the instrument ports 28, 29 of the device 10 are communicatively coupled to respective instruments 140, 142. In some cases, the device 10 is provided as a single unit that allows the device 10 to be deployed at a single point along a communication path. In the illustrated embodiments, the packet switch 40 is configured to receive packets from nodes 130, 132 via the network ports 12, 14, and process the packets in accordance with a predefined scheme. For example, the packet switch 40 may pass packets received from one or more nodes to one or more instruments that are connected to respective instrument port(s).

During the normal operation of the device 10, the power source 52 is used to provide power for operating the switch module 40. As long as the switch module 40 is receiving power from the power source 52, the power switch prevents power from the backup power source 64 to be delivered to the switch module 40.

Referring to FIG. 4, in the event of a power failure by the power source 52, the sensing device 60 of the power switch will detect a decrease or absence of a magnitude of a variable, such as a current, a voltage, or a power. For example, if the sensing device 60 is a wire (or a terminal), the wire will not receive any signal that is resulted from the power source 52. In response, the switch 62 (which may be a component of a power switch) then causes the backup power source 64 to deliver power to the active component 40.

As illustrated in the above embodiments, providing the backup power source 64 is advantageous because it allows the active component 40 to be operational even when the power source 52 fails. Thus, even when the active component 40 does not receive any power from the power source 52, the active component 40 can still perform packet switching and/or transmission, so that the instrument(s) coupled to the device 10 can continue to monitor the packets received from the device 10. In some cases, the backup power source 64 may allow the device 10 to support transmission of high speed signal, such as 250 Mhz or higher.

Also, using the backup power source 64 (instead of the relay of FIG. 2) to address power failure is more advantageous because the cable length distance requirement will not be violated in the even of a power failure. For example, the distance between the transmitting node 130 and the network switch device 10 may be d1, and the distance between the receiving node 132 and the network switch device 10 may be d2. When the active component 40 is receiving power from the power source 52, the cable length distance requirement is that $d1 \leq d_{max}$, and $d2 \leq d_{max}$, wherein $d_{max}$ is the maximum allowable cable length distance. When the network switch device's active component 40 does not receive power from the power source 52 (e.g., due to failure of the power source 52), the requirement remains that $d1 \leq d_{max}$, and $d2 \leq d_{max}$. This is because the backup power source 64 maintains the operation of the active component 40, thereby making d1 to be one cable length for comparison with $d_{max}$, and d2 to be another cable length for comparison with $d_{max}$ (because the distance for comparison with $d_{max}$ should be the distance between operating active components).

Figure 2:
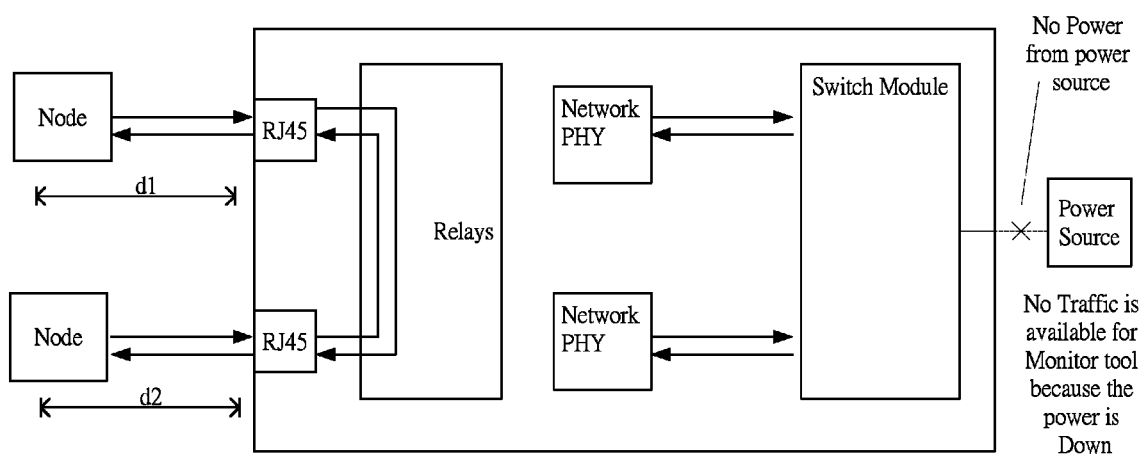
FIG. 2 illustrates the network switch device of FIG. 1, particularly showing the relays being used to connect two nodes in the event of a power failure.

Furthermore, because the backup power source 64 obviates the need to use a relay to directly form a connection between the network ports 12, 14 (like that shown in FIG. 2), the nodes that are communicating through the network switch device 10 will not see any link down in the event of a power failure (which may happen if the relay like that shown in FIG. 2 is used). Thus, even if either or both of the nodes participate in the Spanning Tree Protocol (or the Rapid Spanning Tree Protocol), use of the backup power source 64 will not trigger a Spanning Tree Protocol re-configuration because there is no link down. Thus, using the backup power source 64 instead of the relay shown in FIG. 2 will result in processing of packets that is more reliable.

Figure 5:
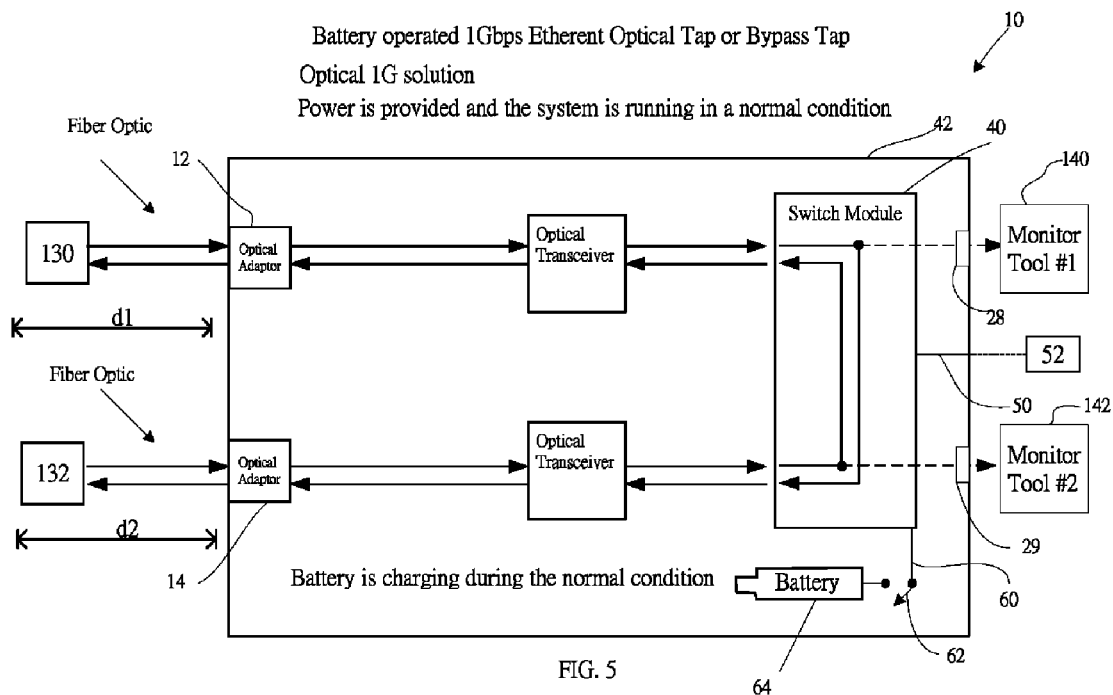
FIG. 5 illustrates a network switch device in accordance with other embodiments, particular showing the network switch device being operated in a normal condition.
Figure 6:
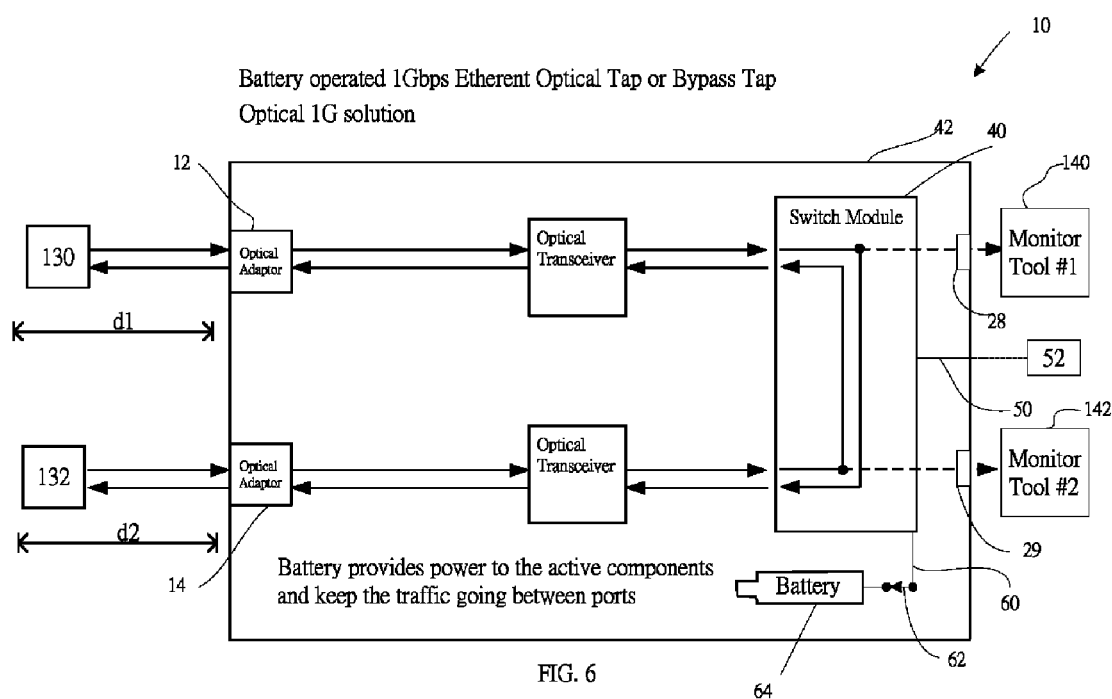
FIG. 6 illustrates the network switch device of FIG. 5, particular showing the network switch device being operated by a backup power source.

In the above embodiments, the device 10 is described as having RJ45 connectors at the network ports 12, 14. In other embodiments, the device 10 may be an optical-based device, in which case, the device 10 will have respective optical adaptors at the network ports 12, 14. FIG. 5 illustrates a variation of the device 10 that includes two (or more) optical adaptors at the network ports 12, 14, particularly showing the device 10 in a normal operation in which the switch module 40 is receiving power from the power source 52. In the illustrated embodiments, the device 10 further includes an optical transceiver coupled to each of the ports 12, 14. The optical transceivers may be considered to be parts of the switch module 40. Alternatively, the optical transceivers may be considered components that are separate from the switch module 40. The optical transceiver is a device that has optical and electrical interfaces, and has a transmitter and receiver which are combined and share common circuitry. FIG. 6 illustrates the device 10 of FIG. 5, particularly showing the device 10 being operated by the backup power source 64 when the switch module 40 is no longer receiving power from the power source 52. In the illustrated embodiments, the device 10 is configured as a 1 Gbps Ethernet optical tap, wherein the ports 12, 14 are configured to operate with respective 1G optical interfaces. In other embodiments, the device 10 may be configured to provide communication that is faster than 1G.

Figure 7:
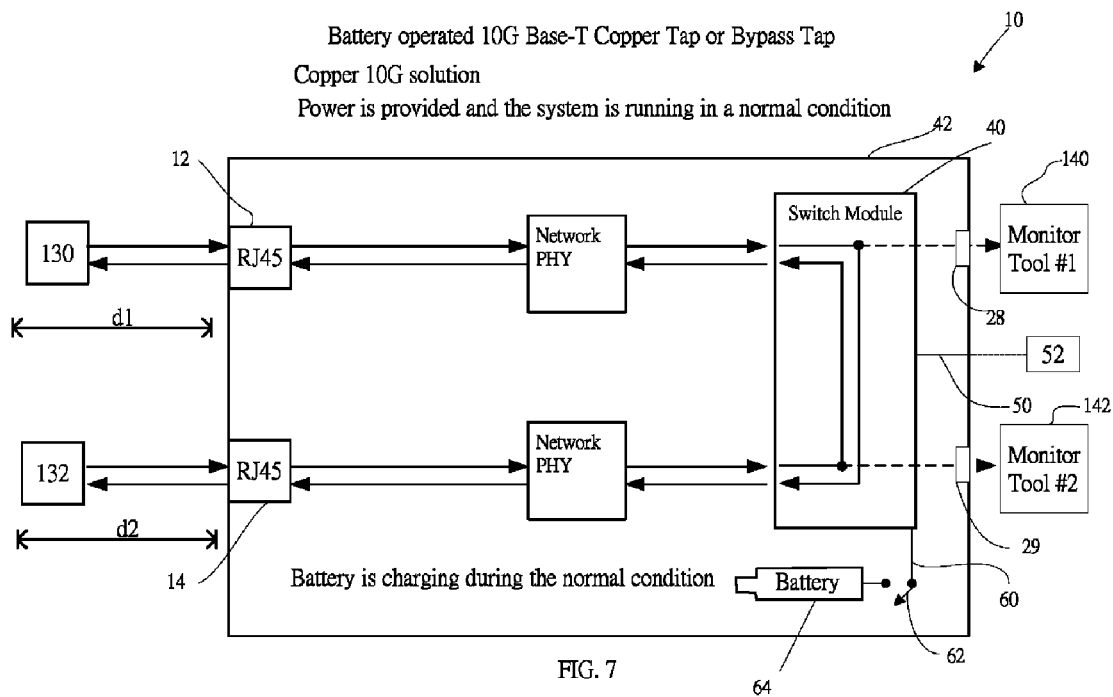
FIG. 7 illustrates a network switch device in accordance with other embodiments, particular showing the network switch device being operated in a normal condition.
Figure 8:
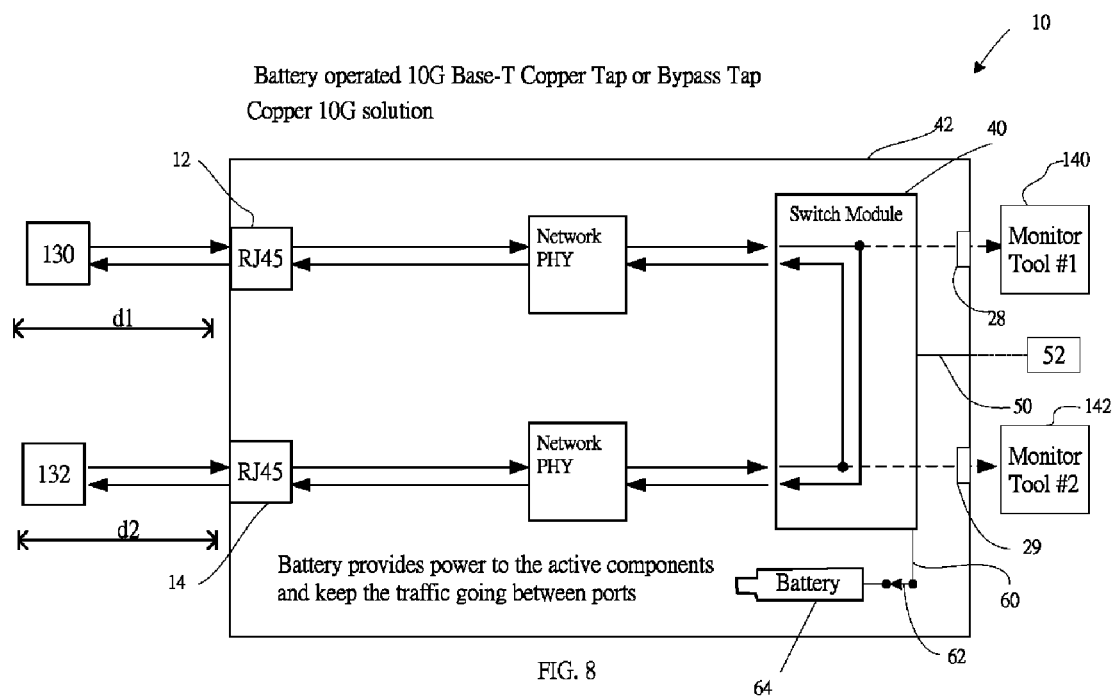
FIG. 8 illustrates the network switch device of FIG. 7, particular showing the network switch device being operated by a backup power source.

Also, in other embodiments, the device 10 may be a 10G Base-T copper tap, in which case, the network ports 12, 14 are configured to operate with respective 10G Base-T interfaces. FIG. 7 illustrates a variation of the device 10 that is configured as a 10G Base-T copper tap, particularly showing the device 10 in a normal operation in which the switch module 40 is receiving power from the power source 52. FIG. 8 illustrates the device 10 of FIG. 7, particularly showing the device 10 being operated by the backup power source 64 when the switch module 40 is no longer receiving power from the power source 52. In other embodiments, the device 10 may be configured to provide communication that is faster than 10G.

Figure 9:
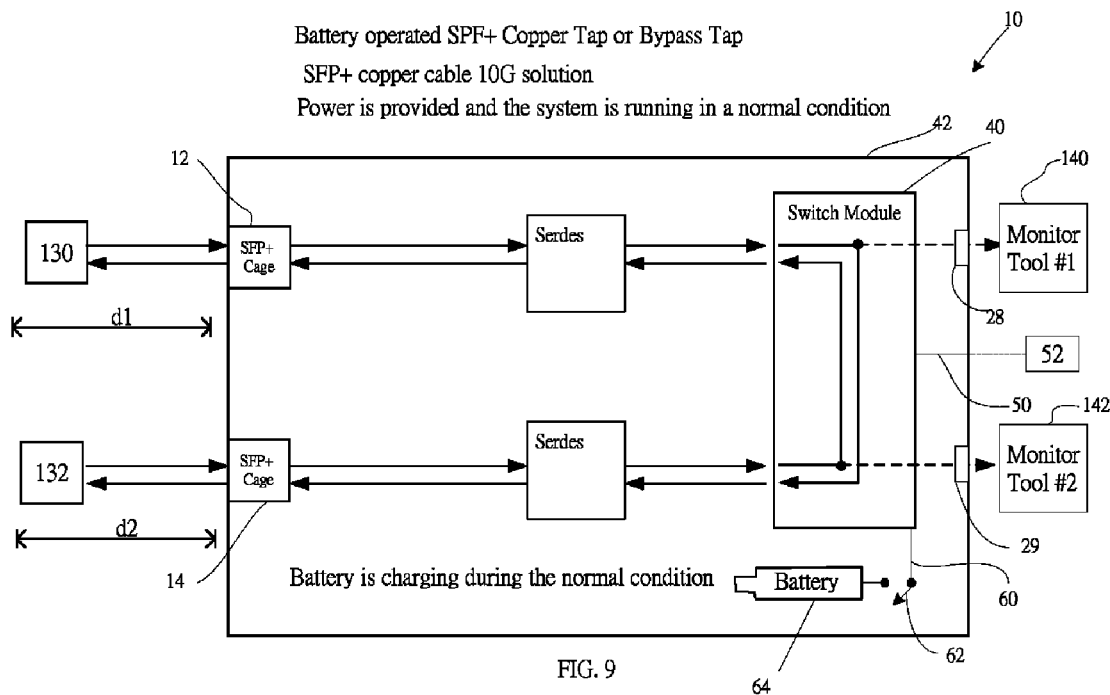
FIG. 9 illustrates a network switch device in accordance with other embodiments, particular showing the network switch device being operated in a normal condition.
Figure 10:
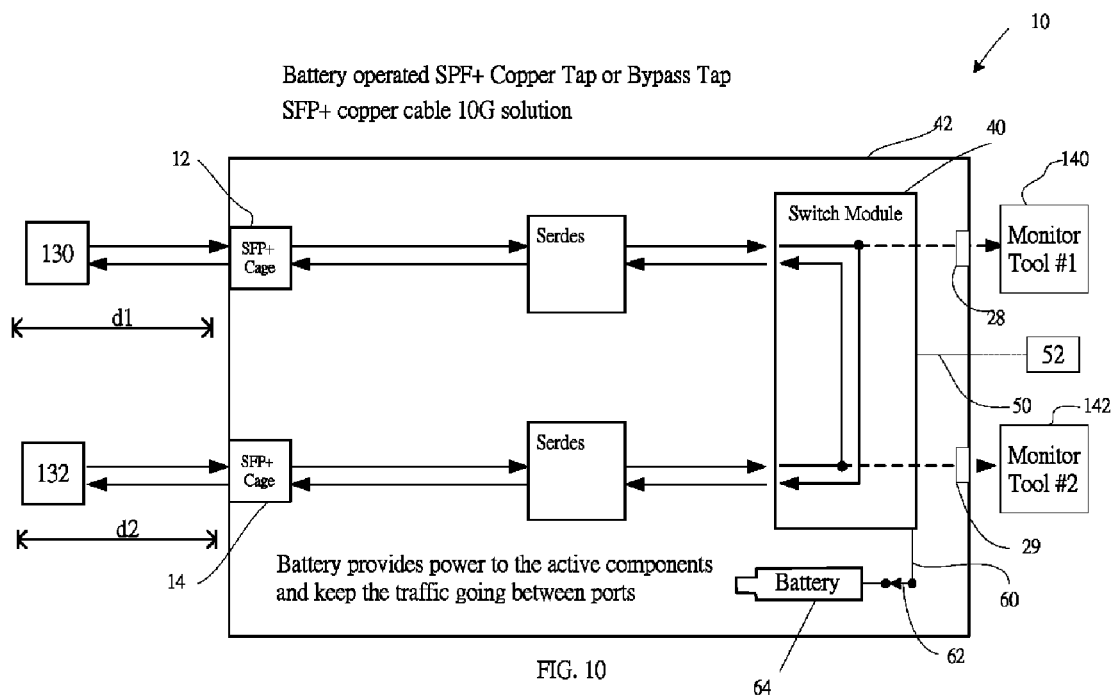
FIG. 10 illustrates the network switch device of FIG. 9, particular showing the network switch device being operated by a backup power source.

Also, in other embodiments, the device 10 may be a SFP+ copper cable tap, in which case, the network ports 12, 14 are configured to operate with respective 10G SFP+ copper cables. FIG. 9 illustrates a variation of the device 10 that is configured as a 10G SFP+ copper cable tap, particularly showing the device 10 in a normal operation in which the switch module 40 is receiving power from the power source 52. As shown in the figure, the device 10 includes serdes that is associated with each of the ports 12, 14. The serdes is a serializer/deserializer, which is a pair of functional blocks configured to compensate for limited input/output. FIG. 10 illustrates the device 10 of FIG. 9, particularly showing the device 10 being operated by the backup power source 64 when the switch module 40 is no longer receiving power from the power source 52. In other embodiments, the device 10 may be configured to provide communication that is faster than 10G.

Figure 11:
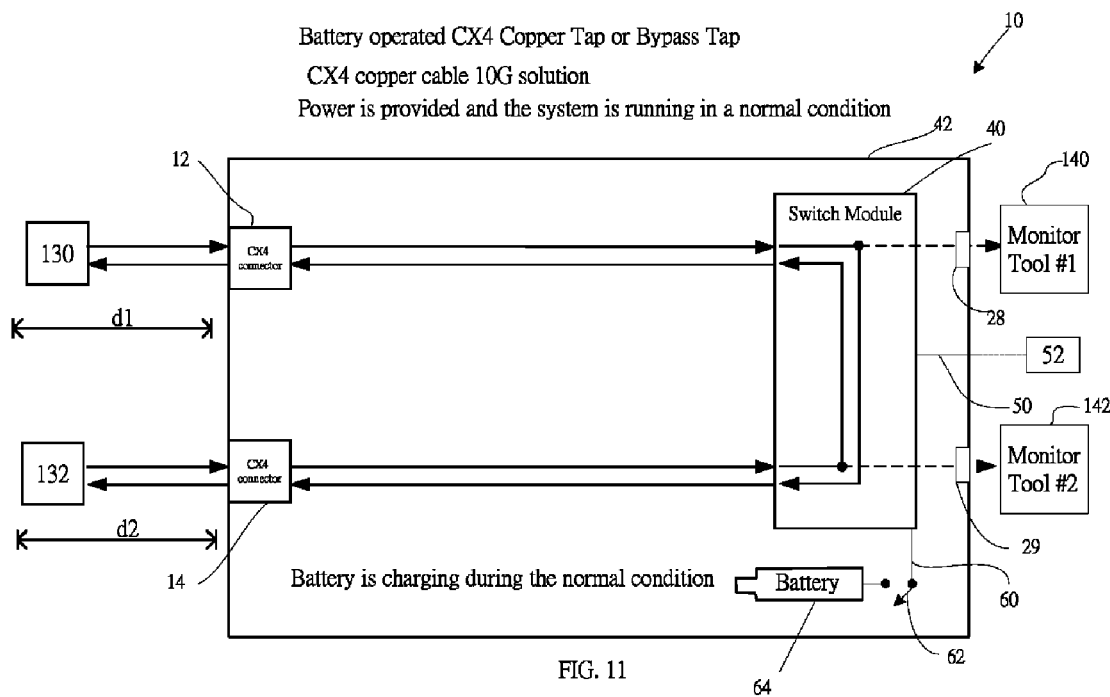
FIG. 11 illustrates a network switch device in accordance with other embodiments, particular showing the network switch device being operated in a normal condition.
Figure 12:
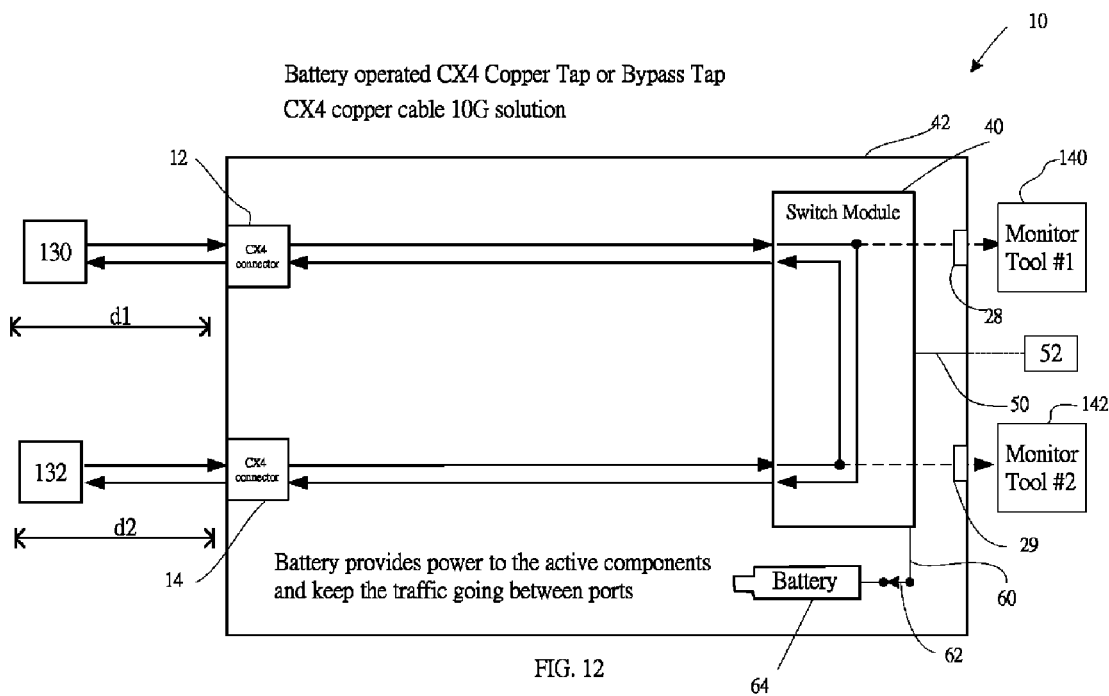
FIG. 12 illustrates the network switch device of FIG. 11, particular showing the network switch device being operated by a backup power source.

Also, in other embodiments, the device 10 may be a CX4 copper cable tap, in which case, the network ports 12, 14 are configured to operate with respective CX4 cables. FIG. 11 illustrates a variation of the device 10 that is configured as a 10G CX4 copper cable tap, particularly showing the device 10 in a normal operation in which the switch module 40 is receiving power from the power source 52. In some embodiments, the device 10 may further include Network PHY (not shown), like that shown in some of the previously described embodiments. FIG. 12 illustrates the device 10 of FIG. 11, particularly showing the device 10 being operated by the backup power source 64 when the switch module 40 is no longer receiving power from the power source 52. In other embodiments, the device 10 may be configured to provide communication that is faster than 10G.

In the above embodiments, although only two network ports 12, 14 are shown, in other embodiments, the device 10 may include more than two network ports. Also, although only two instrument ports 28, 29 are shown, in other embodiments, the device 10 may include more than two instrument ports, so that the device 10 may communicate with more than two instruments.

Also, in the above embodiments, the instrument ports 28, 29 are described as communicating with respective instruments 140, 142, each of which is a non-pass through device. In other embodiments, the device 10 may be coupled to only one instrument during use. In such cases, the device 10 may include only one instrument port, or if the device 10 has more than one instrument port, then only one of the instrument ports is used.

Figure 13:
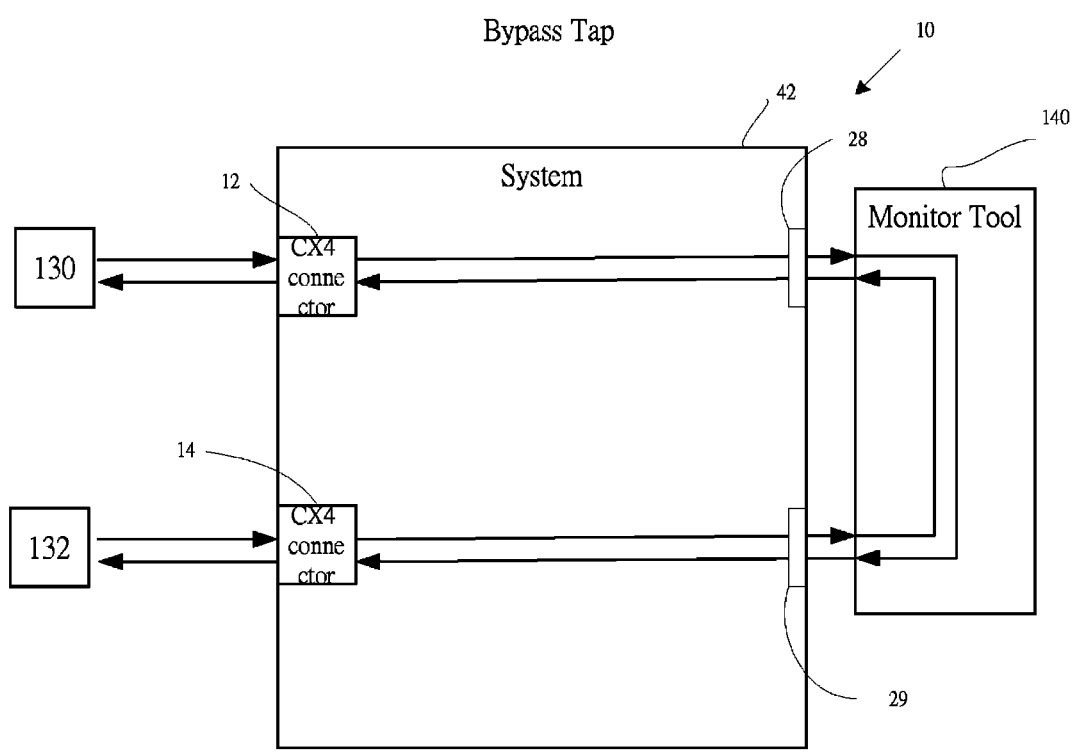
FIG. 13 illustrates a network switch device in accordance with other embodiments.

Also, in other embodiments, each of the instrument ports 28, 29 may be an inline port (a bi-directional port) configured to communicate with a pass-through device 140 (FIG. 13). In such cases, each of the instrument ports 28, 29 can transmit packets from the device 10 to the instrument, and can receive packets from the instrument after the packets have been processed. During use, the instrument ports 28, 29 of the device 10 are communicatively coupled to an instrument 140, which is an intrusion prevention system (IPS), for transmitting and receiving packets to and from the IPS 140. It should be noted that IPS is inline and is connected to the two inline ports 28, 29 of the device 10. During use, the device 10 is configured to transmit packets to, and receive packets from, the IPS 140, wherein the packets are intended to be communicated between two nodes 130, 132. Thus, IPS is different from, and belongs to a different class of instrument from that of, sniffer, network monitoring system, application monitoring system, intrusion detection system, forensic storage system, and application security system, which can only receive packets that are intended to be communicated between nodes, and cannot transmit such packets. Although only two inline ports 28, 29 are shown, in other embodiments, the device 10 may include additional inline ports for connection to additional instrument(s) 140, e.g., additional IPS(s).

In any of the embodiments described herein the device 10 may further include one or more relays (like those shown in FIG. 2) for directly connecting ports 12, 14. In such cases, the backup power source 64 is the immediate solution for addressing failure of the power source 52. However, if the backup power source 64 fails, then the relays will electrically connect the ports 12, 14, so that packets received from node 130 may be transmitted to node 132, and vice versa, without going through the active component 40.

Figure 14:
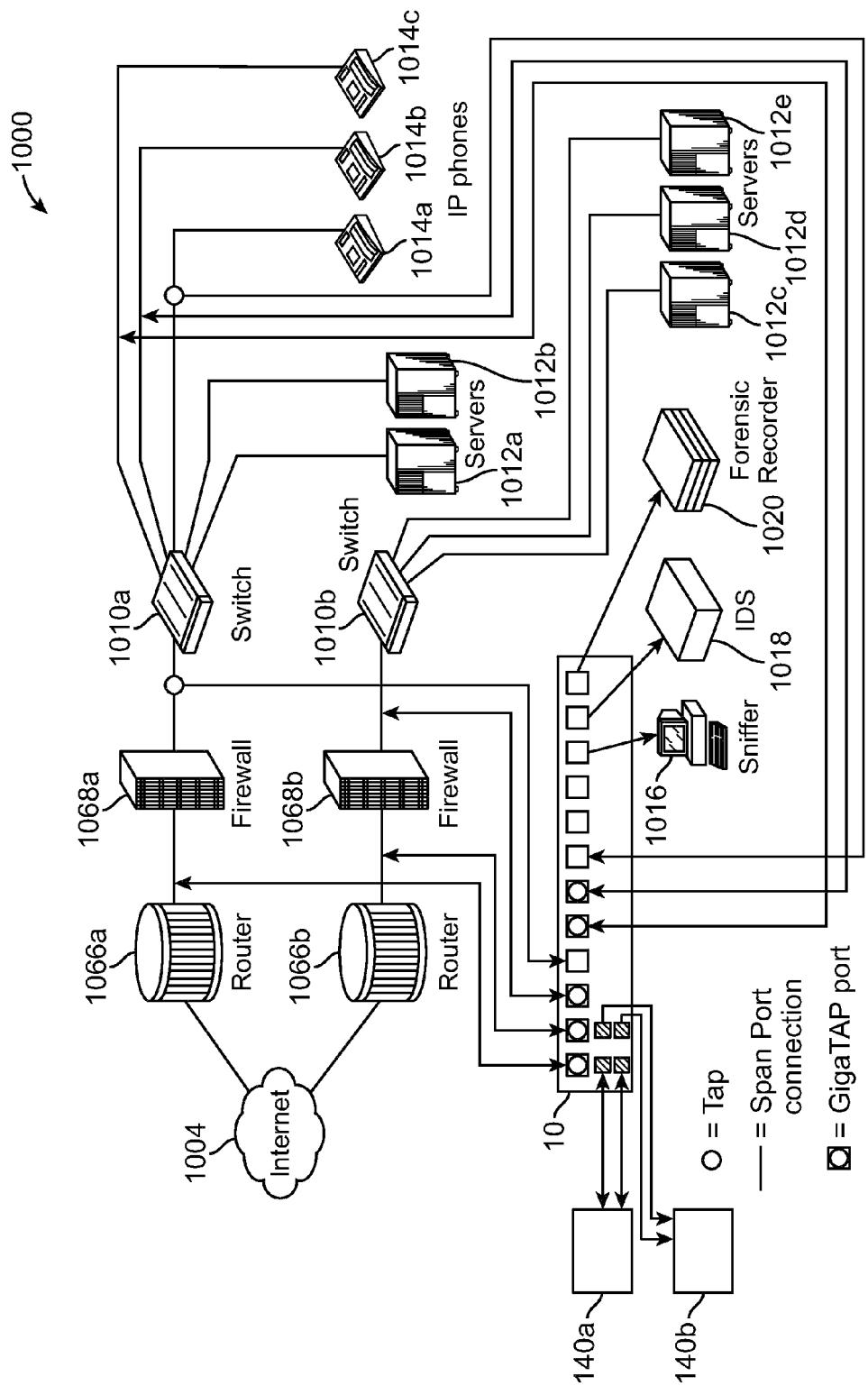
FIG. 14 shows a deployment of a network switch device in a network environment in accordance with some embodiments.

FIG. 14 shows the deployment of the device 10 in a network environment 1000 in accordance with some embodiments. The Internet 1004 is coupled via routers 1006a-b and firewalls 1068a-b to two switches 1010a and 1010b. Switch 1010a is coupled to servers 1012a-b and IP phones 1014a-c. Switch 1010b is coupled to servers 1012c-e. A sniffer 1016, an IDS 1018 and a forensic recorder 1020 (collectively, "non-pass through instruments") are coupled to the device 10. As illustrated in FIG. 14, there is a reduction on the number of non-pass through instruments in this deployment as compared to a conventional configuration (in which there may be one or more non-pass through instruments between router 1066a and firewall 1068a, one or more non-pass through instruments between firewall 1068a and switch 1010a, one or more non-pass through instruments between router 1066b and firewall 1068b, and firewall 1068b and switch 1010b) because the same non-pass through instruments can now access information anywhere in the network environment 1000 through the device 10. The user has complete flexibility to channel whatever traffic to whatever instrument or groups of non-pass through instruments, using the any-to-any, anyto-many and many-to-one capability of the system in accordance with the different embodiments described herein. For example, all the conversations of the IP phones 1014*a-c* can be easily configured to be sent to an IDS 1018. It is also possible that traffic inside a particular IP phone 1014*a-c* connection can be sent to a sniffer 1016, and Intrusion Detection System 1018 and a forensic recorder 1020 simultaneously via the one-to-many function. The backup power source 64 of the device 10 described herein provides fault-tolerant packet transmission capability. If the network switch of the device 10 fails to function (e.g., due to power failure of the power source 52), the backup power source 64 of the device 10 can maintain connectivity of the network attached to them, and allows the instruments connected to the device 10 to continue performing their monitoring functions.

In some embodiments, when using the device 10, one or more non-pass through instruments (such as IDS, sniffer, forensic recorder, etc.) may be connected to instrument port(s), and one or more pass through instruments 140*a*, 140*b* (e.g., IPS) may be connected to other instrument port(s) (e.g., inline port(s)). Such configuration allows non-pass through instrument(s) and pass through instrument(s) to simultaneously monitor the network traffic. Each non-pass through instrument is in listening mode (i.e., it receives packets intended to be communicated between two nodes), and each pass through instrument is in pass-thru mode (i.e., it receives packets intended to be communicated between two nodes, processes them, and then pass the packets downstream towards the intended recipient node). In some cases, by having both an IDS and an IPS connected to the device 10, the device 10 can compare whether the IDS or the IPS sees more threats, and/or can have a redundant protection such that if the IPS misses any threat, the IDS may pick it up.

It should be noted that when a "packet" is described in this application, it should be understood that it may refer to the original packet that is transmitted from a node, or a copy of it.

Although particular embodiments have been shown and described, it will be understood that they are not intended to limit the present inventions, and it will be obvious to those skilled in the art that various changes and modifications may be made without departing from the spirit and scope of the present inventions. The specification and drawings are, accordingly, to be regarded in an illustrative rather than restrictive sense. The present inventions are intended to cover alternatives, modifications, and equivalents, which may be included within the spirit and scope of the present inventions as defined by the claims.

What is claimed:

1. A network switch apparatus, comprising:
a housing;
a first network port;
a second network port;
a first instrument port;
an active component inside the housing, wherein the active component is configured to receive packets from the first network port, and pass at least some of the packets from the first network port to the first instrument port;
a connector for supplying power from a power supply to the active component; and
a backup power supply for supplying power to the active component when the active component does not receive power from the power supply;
wherein a cable length distance requirement associated with the network switch apparatus remains satisfied regardless of whether the active component receives the power from the power supply or not.

2. The network switch apparatus of claim 1, wherein the active component comprises a switch module that operates in accordance with a predetermined movement configuration.

3. The network switch apparatus of claim 2, wherein the movement configuration comprises a one-to-one, one-to-many, many-to-one, or a many-to-many configuration.

4. The network switch apparatus of claim 1, further comprising a monitoring device configured to monitor a parameter, or lack thereof, that is associated with the power being delivered from the power supply to the active component, wherein the parameter comprises a voltage, a current, a resistance, or a magnitude of the power from the power supply.

5. The network switch apparatus of claim 1, wherein the backup power supply comprises a battery.

6. The network switch apparatus of claim 5, wherein the battery is rechargeable, and is coupled to the power supply for charging the battery when the active component is not using the battery.

7. The network switch apparatus of claim 1, wherein the backup power supply comprises a capacitor.

8. The network switch apparatus of claim 7, wherein the capacitor comprises a supercapacitor.

9. The network switch apparatus of claim 1, wherein the backup power obviates a need to use a relay for directly coupling the first network port to the second network port when a failure of the power supply occurs.

10. The network switch apparatus of claim 1, wherein the first network port comprises a RJ45 connector, an optical connector, a SFP+ connector, or a CX4 connector.

11. The network switch apparatus of claim 1, further comprising a second instrument port, wherein the active component is configured to receive packets from the second network port, and pass at least some of the packets from the second network port to the second instrument port.

12. The network switch apparatus of claim 1, further comprising a second instrument port, wherein the first instrument port is configured for passing the at least some of the packets to a monitoring tool, and the second instrument port is configured for receiving the at least some of the packets from the monitoring tool after they have been processed by the monitoring tool.

13. The network switch apparatus of claim 1, wherein the at least some of the packets comprise all of the packets from the first network port.

14. The network switch apparatus of claim 1, wherein the at least some of the packets comprise a first subset of the packets from the first network port, and the active component is configured to pass a second subset of the packets to the second network port.

15. The network switch apparatus of claim 1, wherein the housing is a part of a tap.

16. The network switch apparatus of claim 1, wherein the housing is a part of an inline bypass tap.

17. The network switch apparatus of claim 1, further comprising a power switch for causing the backup power supply to supply backup power to the active component when the active component does not receive any power from the power source.

18. A network switch apparatus, comprising:
a housing;
a first network port;
a second network port;
an inline port for communication with a pass-through device;
an additional inline port for communication with the pass-through device;

an active component inside the housing, wherein the active component is configured to receive packets from the first network port, pass the packets from the first network port to the inline port for processing by the pass-through device, receive the packets from the pass-through device through the additional inline port after the packets have been processed by the pass-through device, and pass the packets from the additional inline port to the second network port;

a connector for supplying power from a power supply to the active component; and a backup power supply for supplying power to the active component when the active component does not receive power from the power supply;

wherein a cable length distance requirement associated with the network switch apparatus remains satisfied regardless of whether the active component receives the power from the power supply or not.

19. The network switch apparatus of claim 18, wherein the pass-through device comprises an intrusion prevention system.

20. The network switch apparatus of claim 18, wherein the active component comprises a switch module that operates in accordance with a predetermined movement configuration.

21. The network switch apparatus of claim 20, wherein the movement configuration comprises a one-to-one, one-to-many, many-to-one, or a many-to-many configuration.

22. The network switch apparatus of claim 18, further comprising a monitoring device configured to monitor a parameter, or lack thereof, that is associated with the power being delivered from the power supply to the active component, wherein the parameter comprises a voltage, a current, a resistance, or a magnitude of the power from the power supply.

23. The network switch apparatus of claim 18, wherein the backup power supply comprises a battery.

24. The network switch apparatus of claim 23, wherein the battery is rechargeable, and is coupled to the power supply for charging the battery when the active component is not using the battery.

25. The network switch apparatus of claim 18, wherein the backup power supply comprises a capacitor.

26. The network switch apparatus of claim 25, wherein the capacitor comprises a supercapacitor.

27. The network switch apparatus of claim 18, wherein the backup power obviates a need to use a relay for directly coupling the first network port to the second network port when a failure of the power supply occurs.

28. The network switch apparatus of claim 18, wherein the first network port comprises a RJ45 connector, an optical connector, a SFP+ connector, or a CX4 connector.

29. The network switch apparatus of claim 18, further comprising a power switch for coupling the backup power supply to the active component when the active component does not receive any power from the power source.

30. The network switch apparatus of claim 1, wherein regardless of whether the active component receives the power from the power supply or not, the network switch apparatus satisfies a first condition $d_1 < d_{max}$, and a second condition $d_2 < d_{max}$, wherein $d_1$ is a first cable distance between a first node and the active component, and $d_2$ is a second cable distance between a second node and the active component, and $d_{max}$ is a maximum allowable distance.

* * * * *